US012492804B2

(12) United States Patent
Takenouchi

(10) Patent No.: US 12,492,804 B2
(45) Date of Patent: Dec. 9, 2025

(54) APPARATUS PROVIDED WITH LIGHTING DEVICE AND PANEL MEMBER PROVIDED WITH LIGHTING DEVICE

(71) Applicant: FUJIFILM CORPORATION, Tokyo (JP)

(72) Inventor: Masaaki Takenouchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/579,511

(22) PCT Filed: Aug. 1, 2022

(86) PCT No.: PCT/JP2022/029542

§ 371 (c)(1),
(2) Date: Jan. 16, 2024

(87) PCT Pub. No.: WO2023/013602

PCT Pub. Date: Feb. 9, 2023

(65) Prior Publication Data

US 2024/0328601 A1 Oct. 3, 2024

(30) Foreign Application Priority Data

Aug. 2, 2021 (JP) ................................ 2021-127011

(51) Int. Cl.
*F21V 15/01* (2006.01)
*B41J 29/19* (2006.01)
(Continued)

(52) U.S. Cl.
CPC ............... *F21V 15/01* (2013.01); *B41J 29/19* (2013.01); *F21V 3/02* (2013.01); *F21Y 2105/16* (2016.08);
(Continued)

(58) Field of Classification Search
CPC .. F21V 15/01; F21V 3/02; F21V 33/00; B41J 29/19; B41J 29/00; F21Y 2105/16;
(Continued)

(56) References Cited

U.S. PATENT DOCUMENTS 7,121,614 B2 * 10/2006 Kawai ...................... B60Q 1/32 296/180.2
8,973,962 B2 * 3/2015 Van Arnam .............. A61G 3/00 296/19
(Continued)

FOREIGN PATENT DOCUMENTS

JP 2006-1490 A 1/2006
JP 2006-243362 A 9/2006
(Continued)

OTHER PUBLICATIONS

English language translation of the following: Notice dated Sep. 10, 2024 from the JPO in a Japanese patent application No. 2021-127011 corresponding to the instant patent application. This office action translation is submitted now in order to supplement the understanding of the cited references which are being disclosed in the instant Information Disclosure Statement.
(Continued)

*Primary Examiner* — Tsion Tumebo
(74) *Attorney, Agent, or Firm* — SOLARIS Intellectual Property Group, PLLC

(57) ABSTRACT

An apparatus provided with a lighting device, including a lighting device disposed along a first face of the apparatus, an in-line portion that is at a position in line with the lighting device, and an exposing portion that is provided at the in-line portion and that exposes an end face of the lighting device.

7 Claims, 9 Drawing Sheets

(51) Int. Cl.
*F21V 3/02* (2006.01)
*F21Y 105/16* (2016.01)
*F21Y 105/18* (2016.01)
*F21Y 115/15* (2016.01)

(52) U.S. Cl.
CPC ....... *F21Y 2105/18* (2016.08); *F21Y 2115/15* (2016.08)

(58) Field of Classification Search
CPC .............. F21Y 2105/18; F21Y 2115/15; F21Y 2115/10; F21S 2/00; G03G 21/00
See application file for complete search history.

(56) References Cited

U.S. PATENT DOCUMENTS

| | | | | |
|---|---|---|---|---|
| 2007/0177398 | A1 | 8/2007 | Uematsu et al. | |
| 2018/0270365 | A1 | 9/2018 | Ishida et al. | |
| 2019/0064693 | A1* | 2/2019 | Kim | G03G 15/04054 |
| 2020/0110308 | A1* | 4/2020 | Hattori | G06F 1/1696 |
| 2020/0209636 | A1* | 7/2020 | Suzuki | B41J 11/0095 |

FOREIGN PATENT DOCUMENTS

| | | | | |
|---|---|---|---|---|
| JP | 2012010137 | A | * | 1/2012 |
| JP | 2014-59067 | A | | 4/2014 |
| JP | 1533194 | S | | 9/2015 |
| JP | 2018-154044 | A | | 10/2018 |
| JP | 2020-59125 | A | | 4/2020 |

OTHER PUBLICATIONS

English language translation of the following: Office action dated Jan. 7, 2025 from the JPO in a Japanese patent application No. 2021-127011 corresponding to the instant patent application.

* cited by examiner

APPARATUS PROVIDED WITH LIGHTING DEVICE AND PANEL MEMBER PROVIDED WITH LIGHTING DEVICE

TECHNICAL FIELD

The present disclosure relates to an apparatus provided with a lighting device, and a panel member provided with a lighting device.

BACKGROUND ART

The publication of Japanese Design Registration No. 1533194 discloses a printer provided with light emitting sections at a lower inside of toner bottle mounting holes for each respective color and, for example, having a function such as to notify that the toner in the toner bottle has run out.

SUMMARY OF INVENTION

Technical Problem

In an apparatus provided with a lighting device, sometimes there is an "in-line portion" present at a position in line with the lighting device, such that from the side of the in-line portion, the lighting device is hidden by the in-line portion.

An object of the present disclosure is to improve the visibility of a lighting device from an in-line portion side in a configuration having an in-line portion present at a position in line with the lighting device.

Solution to Problem

A first aspect includes a lighting device disposed along a first face of the apparatus, an in-line portion that is at a position in line with the lighting device, and an exposing portion that is provided at the in-line portion and that exposes an end face of the lighting device.

In a second aspect, the exposing portion is formed contiguously to the in-line portion from a one-end thereof on a lighting device side to an other-end thereof on an opposite side to the lighting device.

In a third aspect, the exposing portion is provided at the in-line portion at a side of the first face of the apparatus.

In a fourth aspect, the exposing portion is configured by making an end face on a first face side of the in-line portion an inclined face.

In a fifth aspect, the lighting device is disposed at an end portion of the first face.

In a sixth aspect, the lighting device has a rectangular shape along a longitudinal direction of the first face as viewed from a first face side.

In a seventh aspect, an end face of the lighting device at an opposite side to a side at which the in-line portion is positioned is exposed.

In an eighth aspect, the end face of the lighting device at the opposite side to a side at which the in-line portion is positioned is disposed along an end portion of the first face.

In a ninth aspect, a portion of the lighting device is exposed on an opposite side to the first face.

A tenth aspect includes a planar portion configuring a flat face, a lighting device disposed along the planar portion, an in-line portion that is at a position in line with the lighting device, and an exposing portion that is provided at the in-line portion and that exposes an end face of the lighting device.

Advantageous Effects

The configuration of the first aspect is a configuration including the in-line portion, and improves the visibility of the lighting device from the in-line portion side compared to a configuration in which the end face of the lighting device is covered by the in-line portion.

The configuration of the second aspect improves the visibility of the lighting device compared to a configuration in which the exposing portion is formed intermittently from the one-end to the other-end.

The configuration of the third aspect improves the visibility of an exposed portion of the lighting device from a diagonal direction from the first face side of the device compared to a configuration in which the exposing portion is provided at a different position to the first face side of the device.

The configuration of the fourth aspect enables a configuration in which the lighting device is exposed to be realized by a simple shape of forming an inclined face.

The configuration of the fifth aspect improves the visibility of the lighting device from the first face end portion side compared to a configuration in which the lighting device is provided at a center of the first face.

The configuration of the sixth aspect enables a length of the lighting device along a shorter direction of the first face to be suppressed compared to a structure in which the lighting device is formed in a rectangular shape along the shorter direction of the first face.

The configuration of the seventh aspect improves the visibility of the lighting device from the opposite side to the in-line portion compared to a configuration in which the end face of the lighting device is covered on the opposite side to the in-line portion.

The configuration of the eighth aspect improves the visibility of the lighting device from the opposite side to the in-line portion compared to a configuration in which the end face on the opposite side to the side at which the in-line portion is positioned is further inward than first face end portion of the device.

The configuration of the ninth aspect improves the visibility of the lighting device from the opposite side to the first face of the device.

The configuration of the tenth aspect, in a configuration including an in-line portion, improves the visibility of the lighting device from the in-line portion side compared to a configuration in which the end face of the lighting device is covered by the in-line portion.

DESCRIPTION OF EMBODIMENTS

Description follows regarding an example of an exemplary embodiment according to the present disclosure, with reference to the drawings.

Image Forming Apparatus 10

Figure 1:
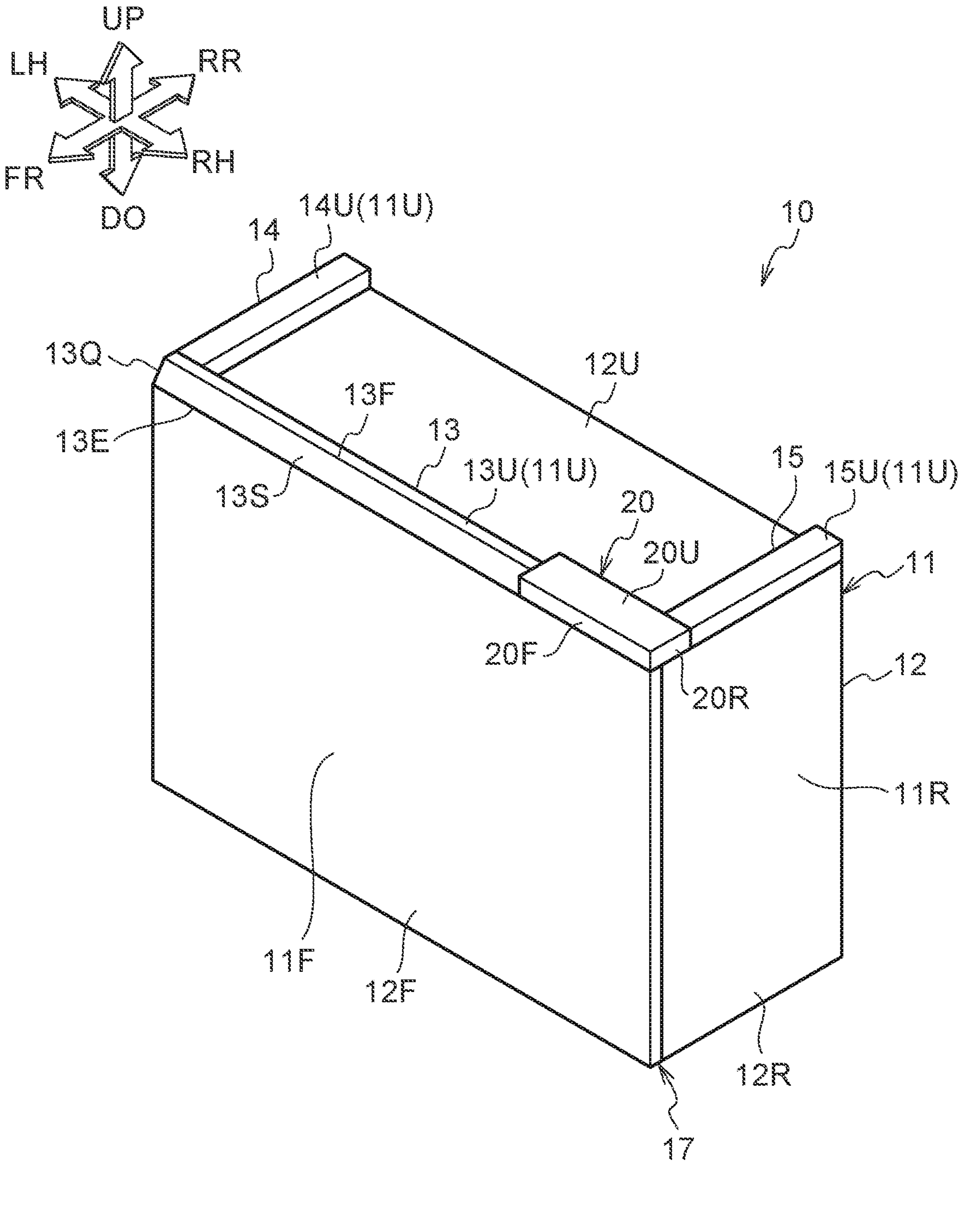
FIG. 1 is a perspective view illustrating a case in which an image forming apparatus provided with a lighting device according to the present exemplary embodiment is viewed from the front right and above.
Figure 2:
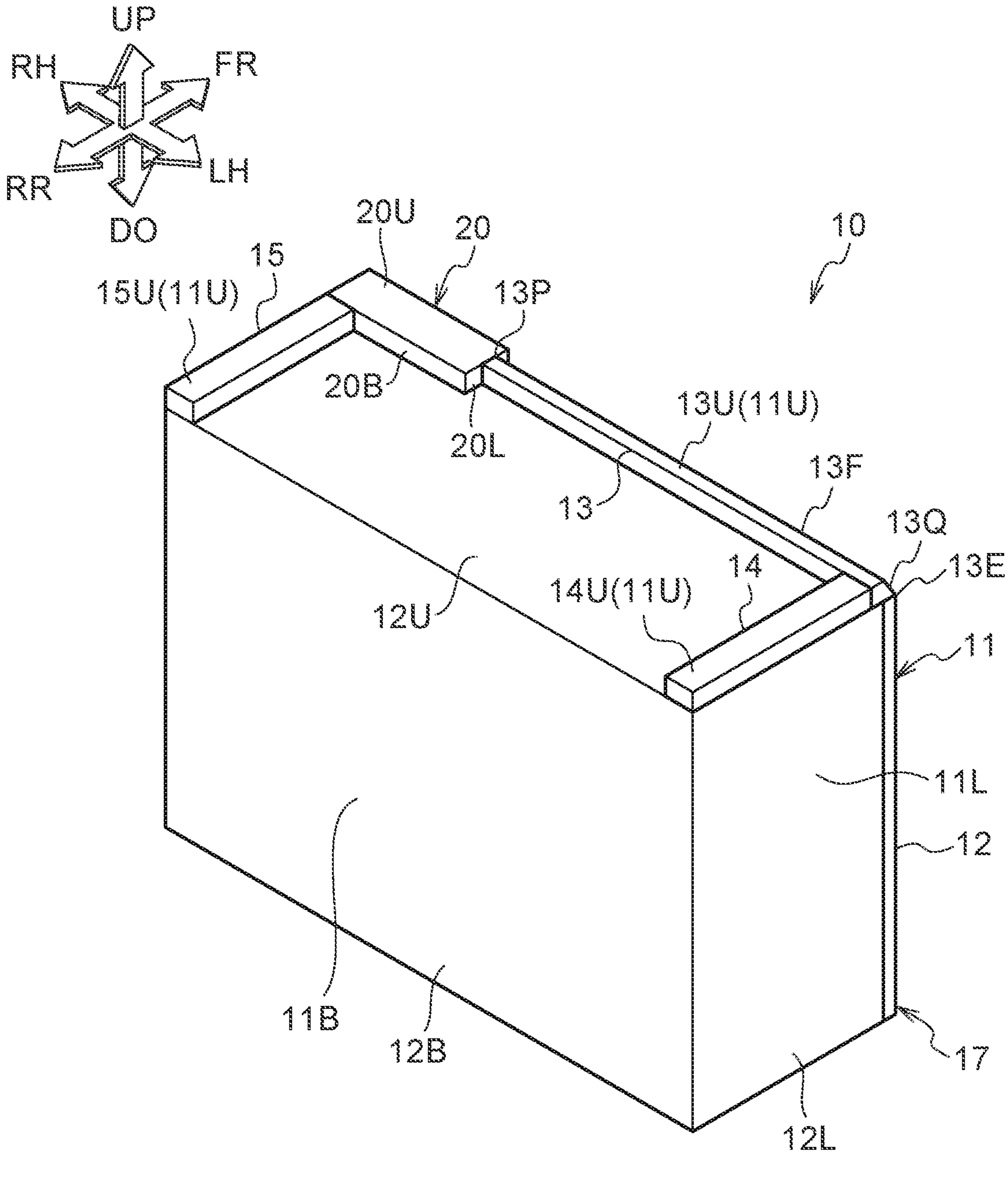
FIG. 2 is a perspective view illustrating a case in which an image forming apparatus provided with a lighting device according to the present exemplary embodiment is viewed from the rear left and above.
Figure 3:
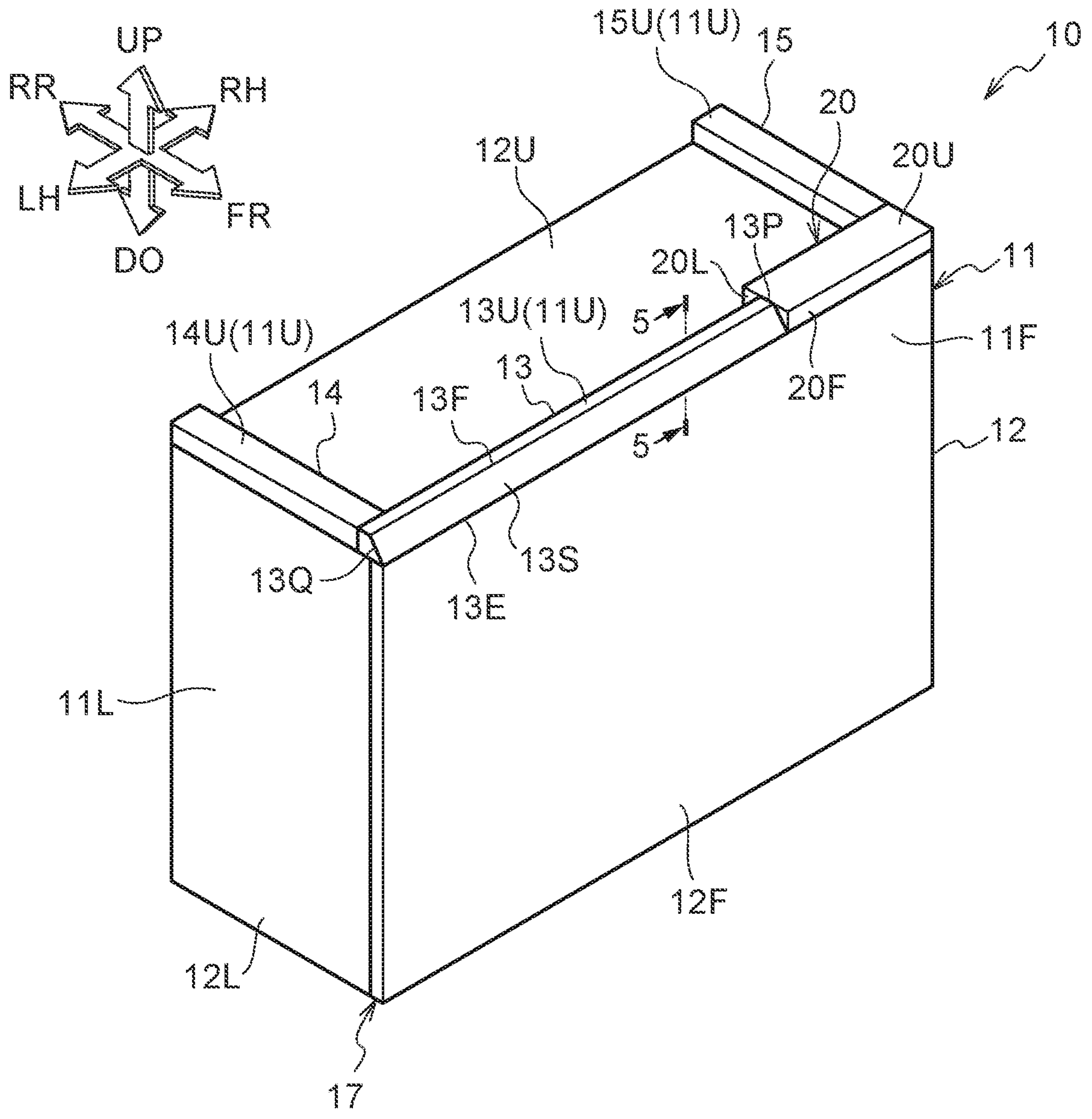
FIG. 3 is a perspective view illustrating a case in which an image forming apparatus provided with a lighting device according to the present exemplary embodiment is viewed from the front right and above.
Figure 4:
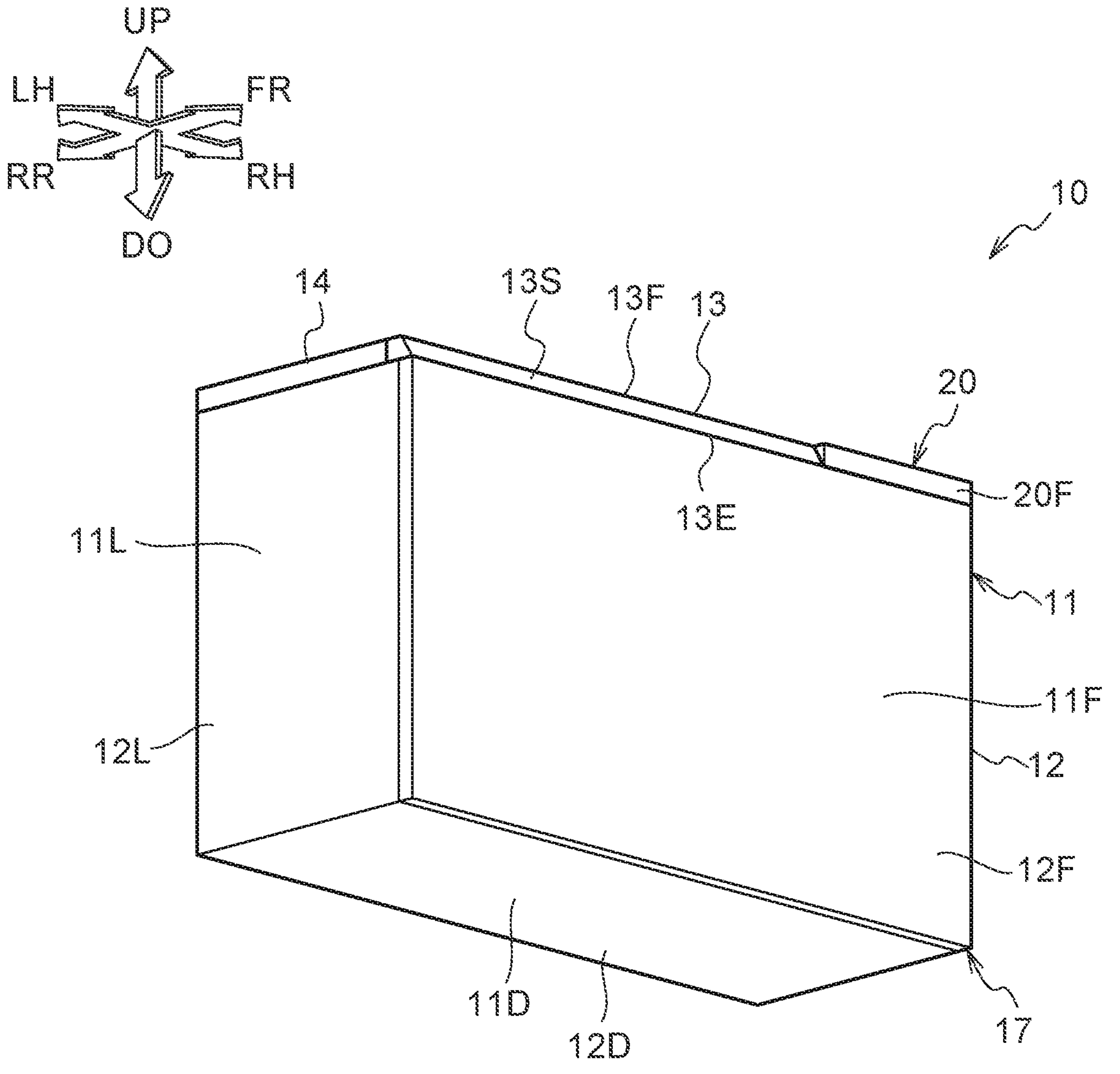
FIG. 4 is a perspective view illustrating a case in which an image forming apparatus provided with a lighting device according to the present exemplary embodiment is viewed from the front right and below.

Explanation follows regarding an image forming apparatus 10 provided with a lighting device 20 according to the present exemplary embodiment. FIG. 1 is a perspective view illustrating a case in which the image forming apparatus 10 is viewed from the front right and above. FIG. 2 is a perspective view illustrating a configuration in which the image forming apparatus 10 is viewed from the rear left and above. FIG. 3 is a perspective view illustrating a case in which the image forming apparatus 10 is viewed from the front left and above. FIG. 4 is a perspective view illustrating a case in which the image forming apparatus 10 is viewed from the front left and below.

In the drawings, arrows UP indicate an upward direction (namely, vertically upward) and arrows DO indicate a downward direction (namely, vertically downward). In the drawings, arrows LH indicate a leftward direction and arrows RH indicate a rightward direction. In the drawings, arrows FR indicate a forward direction and arrows RR indicate a rearward direction. These directions are directions determined for ease of explanation, and the apparatus configuration is not limited by these directions. Moreover, when indicating each position with respect to a given reference, sometimes the reference is omitted. Namely, "upward in the apparatus" is sometimes simply referred to as "upward".

Moreover, in the following description an "up-down direction" is sometimes employed to mean "both directions of an upward direction and a downward direction" or to mean "one direction from out of an upward direction or a downward direction". "Left-right direction" is sometimes employed to mean "both directions of a right direction and a left direction" or to mean "one direction from out of a right direction or a left direction". Note that "left-right direction" may also be said to be an across direction and a horizontal direction. "Front-rear direction" is sometimes employed to mean "both directions of a forward direction and a rearward direction" or to mean "one direction from out of a forward direction or a rearward direction". Note that "front-rear direction" may also be said to be an across direction and a horizontal direction. Moreover, the up-down direction, the left-right direction, and the front-rear direction are directions that intersect with each other (specifically are orthogonal directions).

Moreover, a symbol notated by "x" in an "○" in the drawings means an arrow going into the page. Moreover, a symbol notated by "·" in an "○" in the drawings means an arrow coming out from the page.

Moreover, unless explicitly stated otherwise in the specification, each element is not limited to being a single element and there may be plural present thereof. Moreover, in the drawings the same reference numerals are appended to elements that are substantially the same as each other, and duplicate explanation thereof will be omitted in the specification.

The image forming apparatus 10 illustrated in FIG. 1 to FIG. 4 is an apparatus for forming images. More specifically, the image forming apparatus 10 includes an image forming apparatus main body 11, a lighting device 20, and a non-illustrated image forming section.

The image forming apparatus 10 is an example of an "apparatus provided with a lighting device". Description follows regarding each section of the image forming apparatus 10.

Image Forming Apparatus Main Body 11

The image forming apparatus main body 11 illustrated in FIG. 1 to FIG. 4 is a portion in which each configuration section of the image forming apparatus 10 is provided.

The image forming apparatus main body 11 includes, specifically, a case 12 and jutting out portions 13, 14, 15.

The case 12 is formed in a substantially cuboidal shape including, as illustrated in FIG. 1 to FIG. 4, a front cover 12F, a right cover 12R, a left cover 12L, a rear cover 12B, an upper cover 12U, and a lower cover 12D. A front face 11F, right side face 11R, left side face 11L, rear face 11B, and a lower face 11D of the image forming apparatus main body 11 are each respectively configured by the front cover 12F, the right cover 12R, the left cover 12L, the rear cover 12B, the upper cover 12U, and the lower cover 12D. Moreover, an upper face 11U of the image forming apparatus main body 11 is configured by upper faces 13U, 14U, 15U of the jutting out portions 13, 14, 15, described later. The front face 11F of the image forming apparatus main body 11 is an example of a first face of the image forming apparatus 10. The front face 11F has a rectangular shape, with its longitudinal direction along the left-right direction.

The lighting device 20 is formed in a substantially cuboidal shape including a front face 20F, a right side face 20R, a left side face 20L, a rear face 20B, an upper face 20U, and a non-illustrated lower face. When the lighting device 20 is viewed from the front face 11F side of the image forming apparatus main body 11, the front face 20F of the lighting device 20 has a rectangular shape along the longitudinal direction of the front face 11F of the image forming apparatus main body 11.

Figure 5:
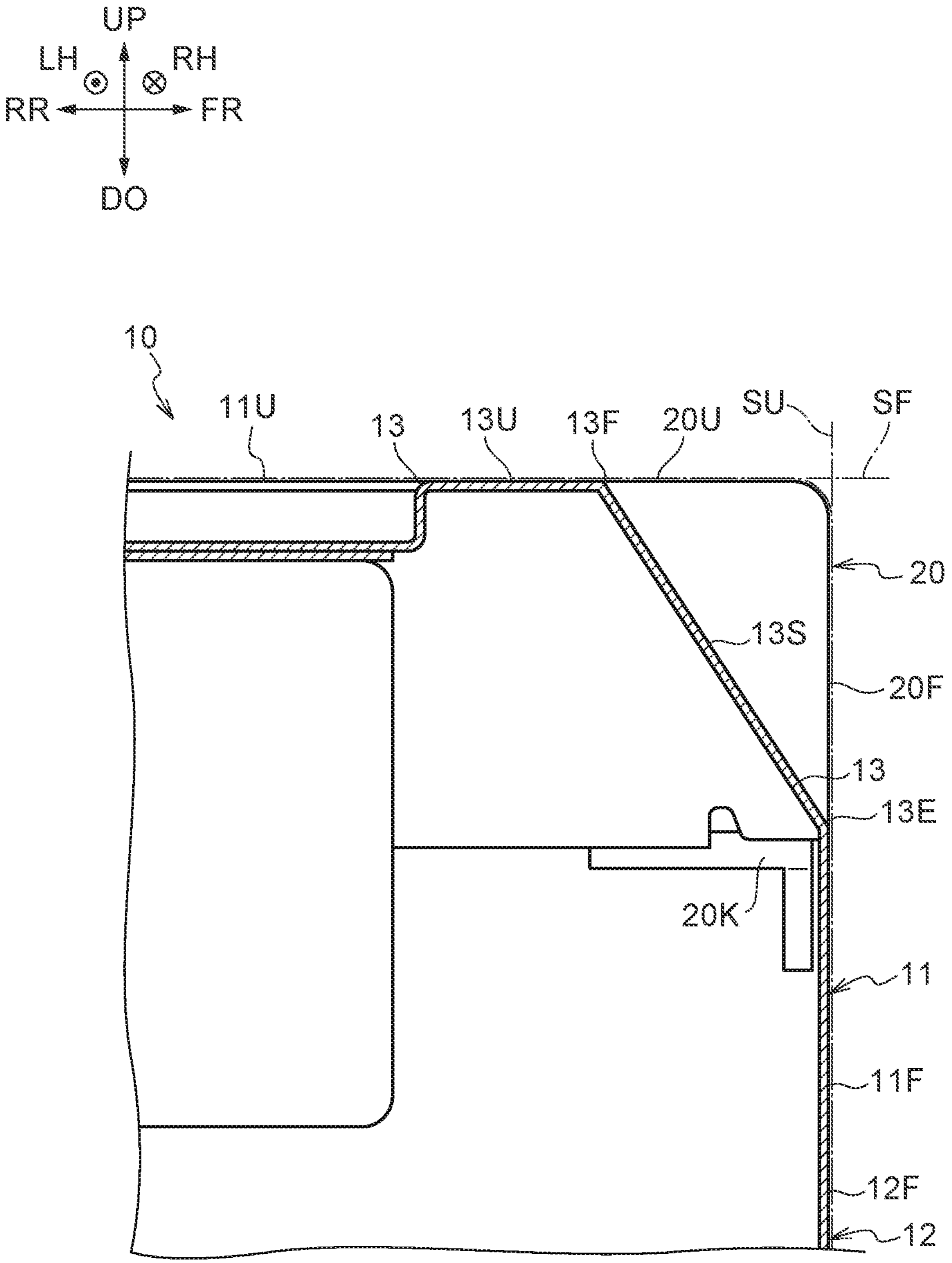
FIG. 5 illustrates an image forming apparatus provided with a lighting device according to the present exemplary embodiment in a cross-section taken along line 5-5 of FIG. 3.

As illustrated in FIG. 5, the lighting device 20 includes a fixing tab 20K. The lighting device 20 can be attached to the case 12 by fixing this fixing tab 20K to the front cover 12F, for example.

The lighting device 20 is disposed along the front face 11F of the image forming apparatus main body 11 at a portion in front of the upper cover 12U and on the right of the case 12. When the image forming apparatus main body 11 is viewed from above, the front face 20F of the lighting device 20 in a state aligned with the front face 11F of the image forming apparatus main body 11.

The lighting device 20 is disposed at a right end portion of the front face 11F, and the right side face 20R of the lighting device 20 is exposed from the right side face 11R of the image forming apparatus main body 11. Moreover, the front face 20F of the lighting device 20 is exposed from the front face 11F of the image forming apparatus main body 11.

The lighting device 20 is accordingly visible from the front and right of the image forming apparatus main body 11.

In the lighting device 20, the right side face 20R is an end face on the opposite side to the side at which the jutting out portion 13, serving as an example of an in-line portion, is positioned. The right side face 20R of the lighting device 20 is disposed along an end portion of the front face 11F, serving as a first face of the image forming apparatus main body 11. In other words, the right side face 20R of the lighting device 20 is substantially flush with the right side face 11R of the image forming apparatus main body 11.

As illustrated in FIG. 5, the upper face 11U of the image forming apparatus main body 11 is configured by the upper faces 13U, 14U, 15U of the jutting out portions 13, 14, 15. Moreover, the front face 20F of the lighting device 20 configures a portion of the front face 11F of the image forming apparatus main body 11. As illustrated in FIG. 1, FIG. 3, and FIG. 4, the front face 20F of the lighting device 20 is substantially flush with the front cover 12F of the case 12. Moreover, as illustrated in FIG. 1, FIG. 2, and FIG. 3, the upper face 20U of the lighting device is substantially flush with the upper face 11U of the image forming apparatus main body 11.

In FIG. 5 an upward extension plane SU extending the front face 11F of the image forming apparatus main body 11 upward, and a forward extension plane SF extending the upper face 11U forward, are respectively illustrated by single-dot broken lines. The lighting device 20 is housed inside the upward extension plane SU and the forward extension plane SF, namely is housed at a case 12 side thereof. In side view of the image forming apparatus main body 11 as illustrated in FIG. 5, the lighting device 20 is housed further to the rear side than the upward extension plane SU, and is housed further downward than the forward extension plane SF. More specifically, in the example illustrated in FIG. 5, the front face 20F of the lighting device 20 is positioned aligned with the upward extension plane SU, and the upper face 20U of the lighting device 20 is positioned aligned with the forward extension plane SF. Note that reference to side view means an object (namely in this case the lighting device 20) is viewed from one direction from out of left or right with respect to the object toward the other.

As illustrated in FIG. 1 to FIG. 4, the jutting out portion 13 is disposed along the front face 11F in front of the upper cover 12U and at the left with respect to the lighting device 20. As illustrated in FIG. 2, the jutting out portion 13 juts out upward from the upper cover 12U of the case 12, and extends along the left-right direction. The jutting out portion 13 is at an in-line position on the lighting device 20, and is an example of an "in-line portion". The jutting out portion 13 being an example of an "in-line portion" means that there is a portion on the jutting out portion 13 overlapping with the lighting device 20 when, for example, viewing the lighting device 20 disposed in front of the upper cover 12U from the side.

In the jutting out portion 13, a front end portion 13F of an upper edge of the jutting out portion 13 is positioned further to the rear than a front end portion 13E of a lower edge thereof. In the jutting out portion 13, as illustrated in FIG. 5, an inclined face 13S is formed inclined so as to gradually descend on progression toward the front in side view. More specifically, in the example illustrated in FIG. 5 the inclined face 13S is positioned so as to be separated rearward and downward from the upward extension plane SU and from the forward extension plane SF.

The inclined face 13S has a planar shape and, for example, is a flat shape without a portion protruding upward or forward, and without an indented portion.

A panel member 17 is configured including the jutting out portion 13 formed with the inclined face 13S, the front cover 12F, and the lighting device 20. The front cover 12F forms a flat plane on the panel member 17, and is an example of a planar portion. For example, the panel member 17 may be configured so as to be attachable and detachable in the image forming apparatus main body 11.

In the case of a configuration not formed with the inclined face 13S, the jutting out portion 13 would cover the left side face 20L of the lighting device 20 in side view. In contrast thereto, in the configuration formed with the jutting out portion 13, as described above, the inclined face 13S is present on the jutting out portion 13 at a location separated rearward and downward with respect to the upward extension plane SU and the forward extension plane SF (namely, appears as a notch). Even though the jutting out portion 13, which is an in-line portion, is disposed in-line with the lighting device 20, a portion of the left side face 20L of the lighting device 20 is still be in an exposed state due to the inclined face 13S.

In other words, part of the lighting device 20 is positioned further forward than the inclined face 13S of the jutting out portion 13, and the left side face 20L of the lighting device 20 is exposed due to the inclined face 13S. Namely, an "exposing portion" of the jutting out portion 13 is configured by forming the inclined face 13S on an end face on the front face 11F side of the image forming apparatus main body 11. In other words, providing the "exposing portion" to the jutting out portion 13 means that, as described above, by the jutting out portion 13 becoming an "in-line portion", in side view the "exposing portion" can be said to be present as a portion appearing as a notch, such that a portion of the lighting device 20 is in an exposed state at a portion that would overlap with the lighting device 20 in a case in which the jutting out portion 13 was not provided.

As illustrated in FIG. 1 to FIG. 4, the inclined face 13S is formed contiguously from a one-end 13P that is an end portion on the lighting device 20 side of the jutting out portion 13, to an other-end 13Q that is an end portion on the opposite side of the lighting device 20.

This means that the lighting device 20 is made visible from the left of the image forming apparatus main body 11.

As illustrated in FIG. 1 to FIG. 5, the exposing portion configured by the inclined face 13S is provided at the front face 11F side of the jutting out portion 13.

The exposing portion is configured by inclining the end face on the front face 11F side of the jutting out portion 13.

The jutting out portion 14 is, as illustrated in FIG. 1 to FIG. 4, disposed along the left side face 11L at the left of the upper cover 12U and at the rear with respect to the jutting out portion 13. The jutting out portion 14 juts out upward from the upper cover 12U and extends in the front-rear direction.

The jutting out portion 15 is, as illustrated in FIG. 1 to FIG. 3, disposed along the right side face 11R at the right of the upper cover 12U and at the rear with respect to the lighting device 20. The jutting out portion 15 juts out upward from the upper cover 12U of the case 12 and extends in the front-rear direction.

The jutting out portion 13 may be formed as a separate body to the front cover 12F, or may be integrally molded with the front cover 12F. A configuration in which the jutting out portion 13 is integrally molded with the front cover 12F is a structure in which the lighting device 20 is inset into a recess portion on the right side of the jutting out portion 13 as viewed from the front face 11F side of the image forming apparatus main body 11.

The jutting out portion 14 may be formed as a separate body to the left cover 12L or may be integrally molded therewith. Moreover, the jutting out portion 15 may be formed as a separate body to the right cover 12R or may be integrally molded therewith.

As illustrated in FIG. 1 and FIG. 2, the upper cover 12U of the case 12 is positioned lower than the upper face 20U of the lighting device 20. In other words, the image forming apparatus main body 11 is open at the left with respect to the jutting out portion 15 and at the rear with respect to the lighting device 20. The rear face 11B that is part of the lighting device 20 is thereby exposed from the image forming apparatus main body 11 and the lighting device 20 is visible from the rear of the image forming apparatus main body 11.

A non-illustrated image forming section is an example of an image forming section for forming an image on a recording medium. Examples of such an image forming section include, for example, an inkjet image forming section that forms an image on a recording medium using ink, a xerographic image forming section that forms an image on a recording medium using a toner, and the like.

In an inkjet image forming section, for example, an image is formed on a recording medium by ejecting inkjet droplets onto the recording medium from an ejection section. As an inkjet image forming section, an image may be formed on a recording medium by inkjet droplets being ejected from an ejection section onto a transfer body, and these inkjet droplets then being transferred from the transfer body onto the recording medium.

In a xerographic image forming section, for example, an image is formed on a recording medium by performing each of the processes of electrostatic-charging, photo-exposing, developing, and transferring. In a xerographic image forming section an image may be formed on a transfer body by performing each of the processes of electrostatic-charging, photo-exposing, developing, and transferring, and then the image may be formed on a recording medium by transferring this image from the transfer body to the recording medium.

Note that examples of an image forming section are not limited to being the inkjet image forming section described above or the xerographic image forming section described above, and various image forming section may be employed therefor.

Lighting Device 20

Figure 6:
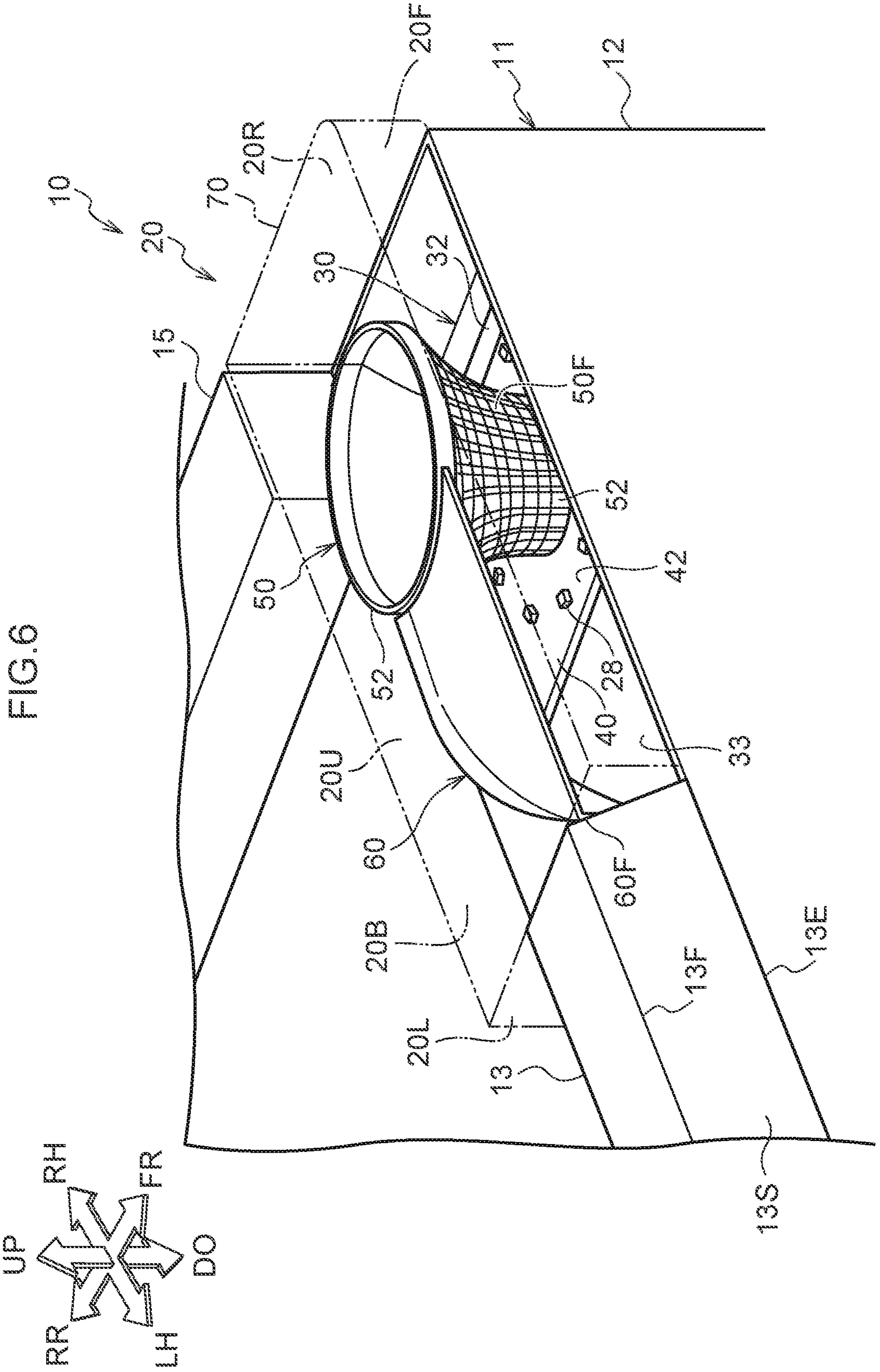
FIG. 6 is a perspective view illustrating a lighting device according to the present exemplary embodiment.
Figure 7:
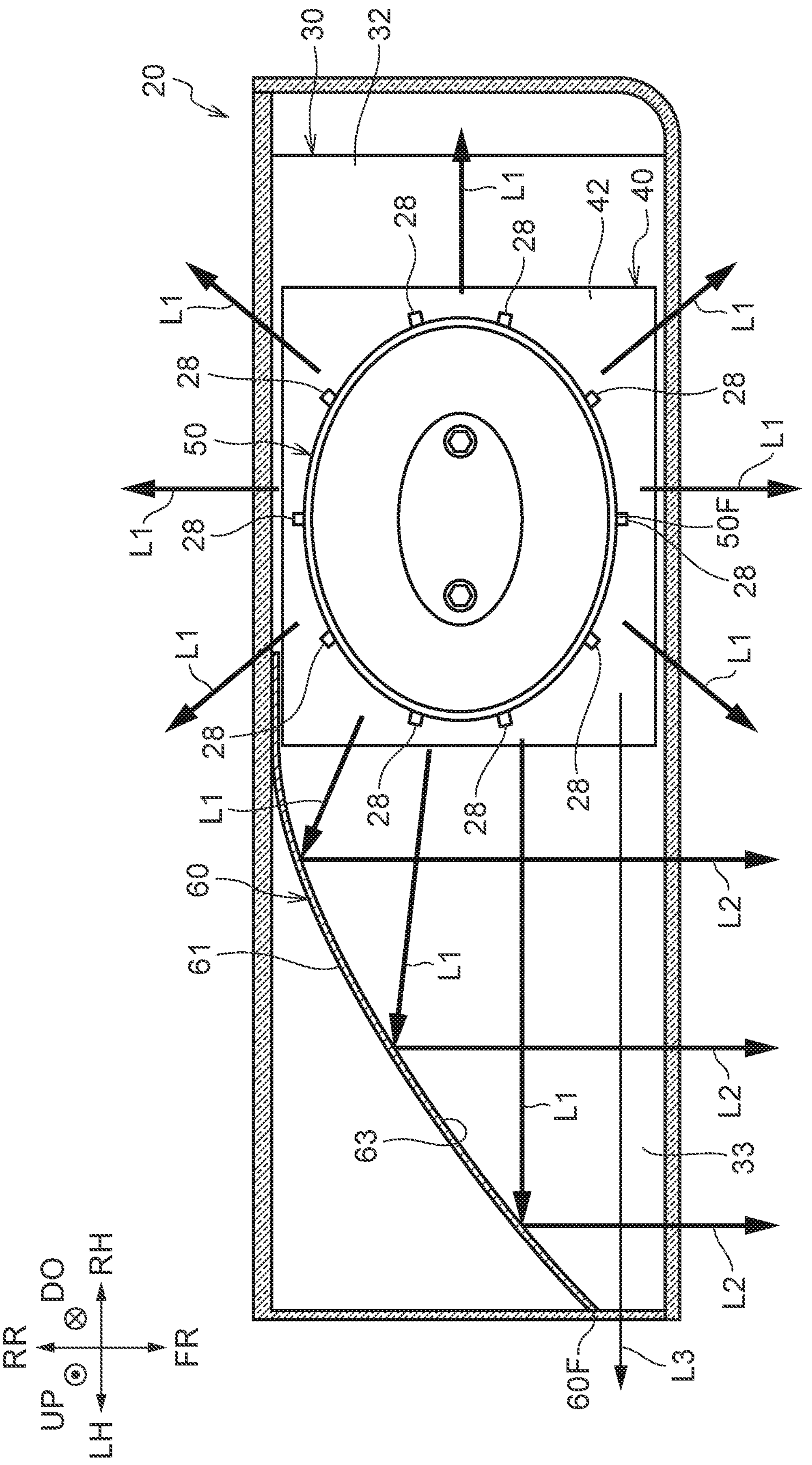
FIG. 7 is a cross-section illustrating progression paths of reflected light in a lighting device according to the present exemplary embodiment.

FIG. 6 is a perspective view illustrating the lighting device 20. FIG. 7 is a plan view cross-section illustrating progression paths of reflected light in the lighting device 20.

The lighting device 20 illustrated in FIG. 6 is a device for illuminating its own surroundings. More specifically, the lighting device 20 includes a base 30, a board 40, light emitting elements 28, a first reflection plate 50, a second reflection plate 60, and a cover 70.

The base 30 is a portion on which each of the configuration portions of the lighting device 20 are disposed. The base 30 is, as an example, formed in a plate shape having a thickness direction in the up-down direction, with a rectangular shape long in the left-right direction in plan view.

The board 40 is disposed at a portion on the right of an upper face 32 of the base 30. A portion of the upper face 32 of the base 30 on the left with respect to the board 40 is configured by a reflection face 33 that reflects light from the light emitting elements 28. The base 30 is, as an example, formed from a resin material, and as an example the upper face 32 including the reflection face 33 is configured as a white surface. Note that the upper face 32 including reflection face 33 may, for example, be a metal-plated surface, and may be any surface that reflects light.

The board 40 is, for example, formed in a rectangular plate shape having a thickness direction in the up-down direction. The board 40 is, for example, configured by a printed board. The board 40 includes an upper face 42 facing upward. The upper face 42 is, specifically, a horizontal surface along a horizontal direction.

The light emitting elements 28 are, as an example, configured from light emitting diode (LED) elements.

Figure 8:
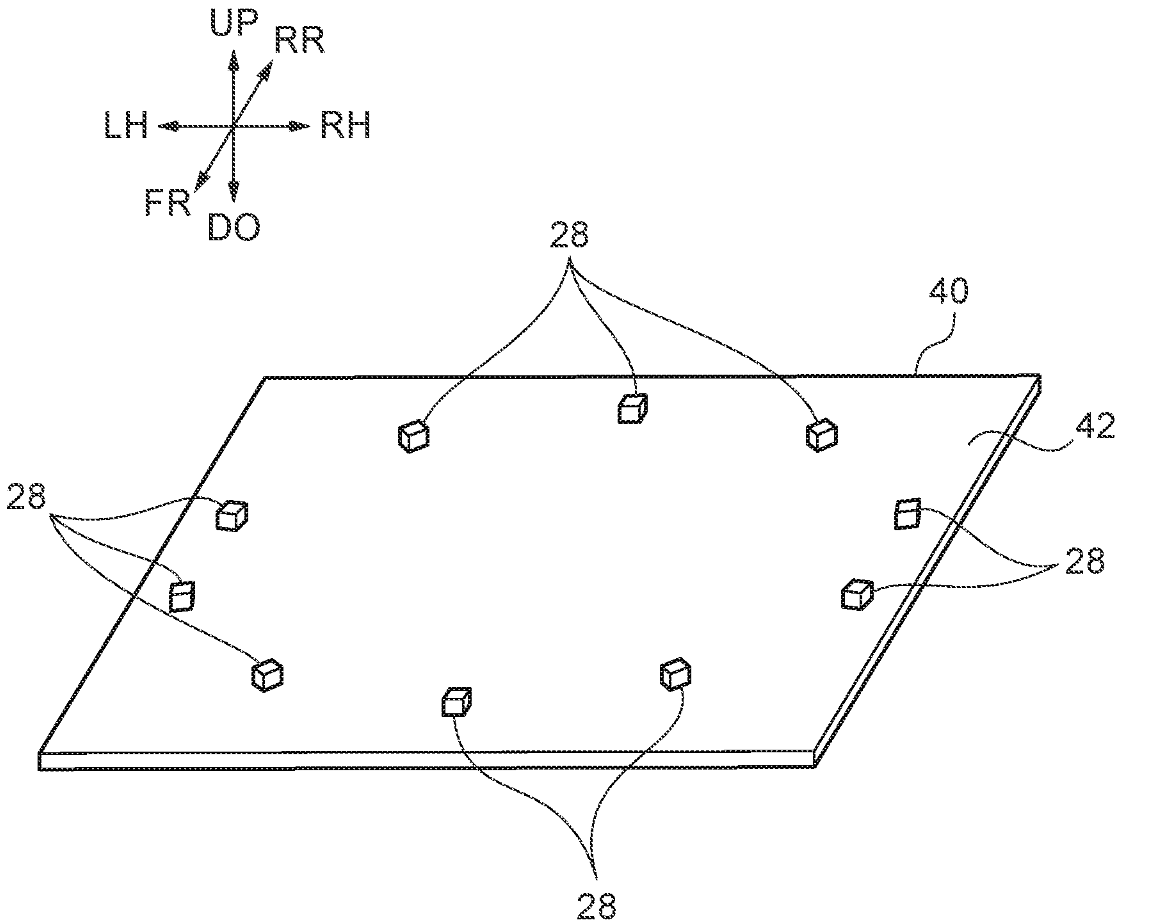
FIG. 8 is a perspective view illustrating a board and light emitting elements in a lighting device according to the present exemplary embodiment.

Plural of the light emitting elements 28 are, as illustrated in FIG. 8, arranged in an elliptical shape on the upper face 42 of the board 40. Specifically, plural of the light emitting elements 28 are disposed in plan view at the front, rear, left, and right with respect to the first reflection plate 50. More specifically, the plural light emitting elements 28 are disposed with, in plan view, one of the light emitting elements 28 at each of the front and rear with respect to the first reflection plate 50, two thereof at each of the left and right with respect to the first reflection plate 50, and one thereof at each of a left-front diagonal, a right-front diagonal, a left-rear diagonal, and a right-rear diagonal with respect to the first reflection plate 50. There are accordingly ten of the light emitting elements 28 arranged around the perimeter of the first reflection plate 50. Note that in plan view refers to a case in which an object (namely in this case the light emitting elements 28) is viewed from above the object downward.

The light emitting elements 28 illuminate light that spreads out upward. Note that the light emitting elements 28 are any light source that shines light onto at least the first reflection plate 50. The light emitting elements 28 are, for example, capable of emitting light selectively in plural colors, such as blue, red, and the like.

The first reflection plate 50 has a function to reflect light from the light emitting elements 28 toward the front, rear, left, and right. The first reflection plate 50 is, as illustrated in FIG. 6, disposed on the upper face 42 of the board 40.

The first reflection plate 50 is, as an example, formed from a resin material, and a surface thereof is, as an example, configured as a white surface. Note that the surface of the first reflection plate 50 may, for example, be a metal-plated surface, and may be any surface that reflects light.

Figure 9:
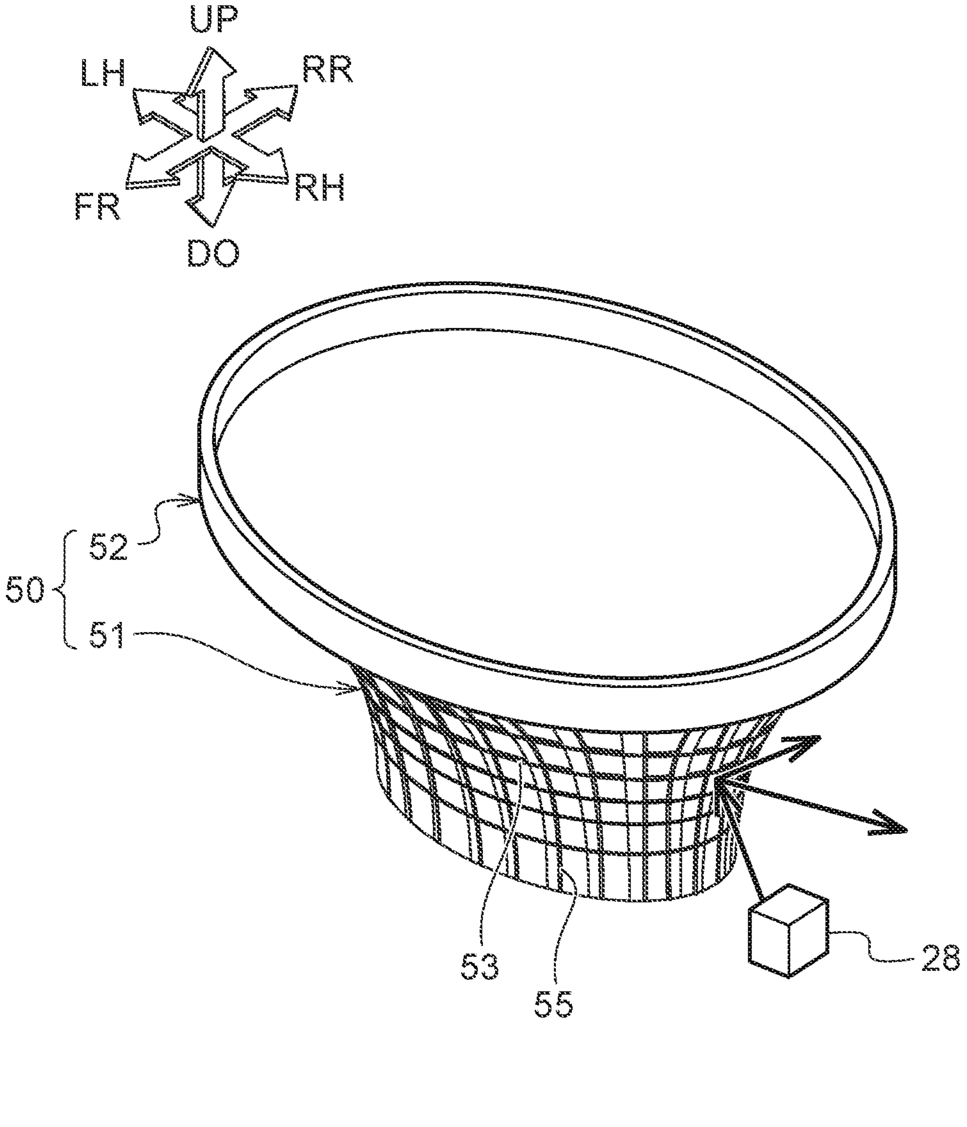
FIG. 9 is a perspective view illustrating a first reflection plate and a light emitting element in a lighting device according to the present exemplary embodiment.

As illustrated in FIG. 9, the first reflection plate 50 is elliptical shaped in plan view with its long axis along the left-right direction, and is formed in a tube shape having an axial direction along the up-down direction. The first reflection plate 50, as illustrated in FIG. 6, includes a curved section 51 that is curved so as to increase in diameter gradually toward the outer peripheral side on progression upward from the board 40, and an upper section 52 extending upward from an upper edge of the curved section 51.

The outer peripheral face of the curved section 51 is, in rearward view, inclined in a curve toward both the right and left on progression upward, and is curved so as to form a convex shape on the inside thereof. In other words, in rearward view, the first reflection plate 50 includes reflection faces 57, 59 inclined as curves respectively toward both the left and right on progression upward. Note that in rearward view refers to when an object (namely in this case the first reflection plate 50) is viewed from the front of the object toward the rear thereof.

On the other hand, as illustrated in FIG. 6, the upper section 52 is formed in an elliptical cylinder shape extending straight upward from an upper edge of the curved section 51. The outer peripheral face of the upper section 52 is an elliptical cylindrical face without indentations or protrusions.

The curved section 51 in the first reflection plate 50 reflects light diffusely from the light emitting elements 28 over a 360 degree range including toward the front, rear, left, and right, as can be seen from arrows L1 in FIG. 7. Note that the first reflection plate 50 also reflects the light from the light emitting elements 28 with the upper section 52 over a 360 degree range including toward the front, rear, left, and right.

As illustrated in FIG. 6, the second reflection plate 60 is disposed at the left with respect to the first reflection plate 50. The second reflection plate 60 has a function of reflecting the light from the first reflection plate 50 forward, as can be seen from arrows L2 as illustrated in FIG. 7. The second reflection plate 60 is as an example, similarly to the first reflection plate 50, formed from a resin material, and a surface thereof is, as an example, configured as a white surface. Note that the surface of the second reflection plate 60 may, for example, be a metal-plated surface, and may be any surface that reflects light.

As illustrated in FIG. 6, the second reflection plate 60 includes an extension section 61 extending upward from the upper face 32 of the base 30. As illustrated in FIG. 7, the extension section 61 includes a reflection face 63 facing forward and curved so as to be a concave shape on the front thereof. The extension section 61 is formed in a plate shape having a thickness direction in a direction intersecting with the reflection face 63. The curvature of the reflection face 63 reduces on progression toward the left.

As illustrated in FIG. 7, a front end portion 60F of the second reflection plate 60 is disposed at the rear with respect to a front end portion 50F of the first reflection plate 50. Namely, the first reflection plate 50 juts out further forward than the second reflection plate 60. This means that the second reflection plate 60 reflects part of the light that has been reflected toward the left from the first reflection plate 50 by reflection forward, as can be seen from arrows L2, and transmits another part of this light pass through toward the left, as can be seen from arrow L3. Namely, the second reflection plate 60 does not block the other part of this light. Moreover, the second reflection plate 60 does not block light reflected both rearward and toward the right from the first reflection plate 50, and allows this light to be emitted outside the lighting device 20.

Furthermore, in the present exemplary embodiment as illustrated in FIG. 6, the front end portion 50F of the first reflection plate 50 is disposed further forward than the front end portion 13F on the upper edge of the jutting out portion 13. On the other hand, the front end portion 60F of the second reflection plate 60 is disposed at the same position in the front-rear direction as the front end portion 13F on the upper edge of the jutting out portion 13.

As illustrated in FIG. 6, the cover 70 is disposed at the front, rear, left, and right with respect to the first reflection plate 50 and the second reflection plate 60. The cover 70 is, as an example, configured formed from a transparent resin material so as to be able to transmit light, such as the reflected light from the first reflection plate 50 and the second reflection plate 60. The cover 70 configures the front face 20F, the right side face 20R, the left side face 20L, the rear face 20B, the upper face 20U, and a non-illustrated lower face of the lighting device 20.

As described above, in the lighting device 20, due to the first reflection plate 50 and the second reflection plate 60 reflecting the light from the light emitting elements 28, light is shone forward such that the position where the first reflection plate 50 is disposed in the left-right direction is the brightest, and the light becomes gradually darker on progression toward the left. Namely, the lighting device 20 illuminates in a gradation mode. Note that the gradation mode is a mode in which there is a contrast in brightest, with this contrast changing continuously.

A non-illustrated control device includes a control function for controlling so as to change the illumination mode of the lighting device 20 according to a drive mode of the image forming apparatus 10. Specifically, the control device performs control to change the illumination mode of the lighting device 20 between an execution mode in which an image forming section 18 is executing an image forming operation, and a stop mode in which the image forming section 18 has stopped abnormally. The mode that the image forming apparatus 10 is in, from out of the execution mode or the stop mode, can accordingly be ascertained by verifying the illumination mode of the lighting device 20.

Operation and Advantageous Effects of Present Exemplary Embodiment

In the image forming apparatus 10 that is an example of an apparatus provided with the lighting device 20, the lighting device 20 is disposed along the front face 11F of the image forming apparatus main body 11. The front face 20F of the lighting device 20 is exposed from the front face 11F side of the image forming apparatus main body 11 and so this enables the front face 20F of the lighting device 20 to be visible from the front face 11F side of the image forming apparatus main body 11.

As illustrated in FIG. 1, and FIG. 3 to FIG. 5, the front face 20F of the lighting device 20 is substantially flush with the front face 11F of the image forming apparatus main body 11. This thereby enables a shape to be obtained without an indentation or a protrusion at the front face 20F of the lighting device 20 and at the front face 11F of the image forming apparatus main body 11, in contrast to a configuration in which the front face 11F of the image forming apparatus main body 11 and the front face 20F of the lighting device 20 are, for example, configured in front of and to the rear of each other. Furthermore, as illustrated in FIG. 1, FIG. 2 and FIG. 3, the upper face 20U of the lighting device is substantially flush with the upper face 11U of the image forming apparatus main body 11. This thereby enables a shape to be obtained without an indentation or a protrusion at the upper face 11U of the image forming apparatus main body 11 and at the upper face 20U of the lighting device 20, in contrast to a configuration in which the upper face 11U of the image forming apparatus main body 11 and the upper face 20U of the lighting device 20 are, for example, configured above and below each other. In addition thereto, as illustrated in FIG. 1, the right side face 20R of the lighting device 20 is substantially flush with the right side face 11R of the image forming apparatus main body 11. This thereby enables a shape to be obtained without an indentation or a protrusion at the right side face 11R of the image forming apparatus main body 11 and at the right side face 20R of the lighting device 20, in contrast to a configuration in which the right side face 20R of the lighting device 20 and the right side face 11R of the image forming apparatus main body 11 are, for example, configured toward the left and right of each other.

The jutting out portion 13 that serves as an example of an in-line portion is positioned at a position in-line with the lighting device 20 and at the left side of the lighting device 20 when viewed from the front face 11F side. An exposing portion is configured by forming the inclined face 13S to the jutting out portion 13, and part of the left side face 20L of the lighting device 20 is exposed thereby. This means that the visibility of the lighting device 20 from the jutting out portion 13 side is improved compared to a case in which there is no exposing portion in a configuration including the jutting out portion 13 disposed in-line with the lighting device 20.

The inclined face 13S configuring the exposing portion is contiguous from the one-end 13P that is an end portion of the jutting out portion 13 on the lighting device 20 side as far as the other-end 13Q that is an end portion of the jutting out portion 13 on the opposite side to the lighting device 20. This means that the visibility is improved of the lighting device 20 compared to a configuration in which the inclined face 13S is formed intermittently to the jutting out portion 13 from the one-end 13P to the other-end 13Q.

The inclined face 13S is provided at the jutting out portion 13 on the front face 11F side of the image forming apparatus main body 11. The inclined face 13S enables a portion exposed at the left side face 20L of the lighting device 20 to be more visible even from diagonally in front at the front face 11F side of the image forming apparatus main body 11 compared to a configuration in which the inclined face 13S is provided at the jutting out portion 13 on the rear face 11B side of the image forming apparatus main body 11.

The inclined face 13S configuring the exposing portion is planar shaped in the example described above, however for example, the inclined face 13S may be formed curved or bent so as to be convex above and in front, or curved or bent so as to be indented. By forming the inclined face 13S in a planar shape, a structure including an exposing portion, namely a structure exposing a portion of the left side face 20L of the lighting device 20, can be realized by a simple shape.

The lighting device 20 is disposed at a right end portion of the image forming apparatus main body 11, and the right side face 20R of the lighting device 20 is exposed when viewed from the right side face 11R of the image forming apparatus main body 11. This means that the visibility of the lighting device 20 is improved compared to a configuration in which the right side face 20R of the lighting device 20 is covered.

The right side face 20R of the lighting device 20 is an end face at the opposite side to the side at which the jutting out portion 13 is positioned, and is disposed along an end portion of the front face 11F serving as a first face of the image forming apparatus main body 11. The right side face 20R of the lighting device 20 is in the same plane as the right side face 11R of the image forming apparatus main body 11, and so the visibility of the right side face 20R of the lighting device 20 is improved compared to a configuration in which the right side face 20R of the lighting device 20 is further toward the left side than the front face 11F of the image forming apparatus main body 11.

The front face 20F of the lighting device 20 is exposed as viewed from the front face 11F side of the image forming apparatus main body 11. This means that the visibility of the lighting device 20 is improved compared to a configuration in which the front face 20F of the lighting device 20 is covered.

The front face 20F of the lighting device 20 has a rectangular shape along the longitudinal direction of the front face 11F of the image forming apparatus main body 11. This means that the length (namely the height) of the lighting device 20 along the shorter direction (namely the up-down direction) of the front face 11F of the image forming apparatus main body 11 can be suppressed compared to a configuration in which the front face of the lighting device 20 is a rectangular shape along the shorter direction (namely the up-down direction) of the front face 11F of the image forming apparatus main body 11.

The rear face 20B of the lighting device 20 is exposed from the image forming apparatus main body 11 at the opposite side to the front face 11F of the image forming apparatus main body 11. The visibility is improved from the rear face 11B side compared to a configuration in which the rear face of the lighting device 20 is covered.

Modified Examples

Although in the present exemplary embodiment the light emitting elements 28 are employed as examples of a light source, there is no limitation thereto. Examples of light sources may include any element that emits light such as, for example, a lamp such as a fluorescent lamp or the like.

Moreover, although LED elements are employed in the present exemplary embodiment as examples of the light emitting elements 28, there is no limitation thereto. Examples of the light emitting elements 28 include any element that emits light, such an organic electro-luminescence (EL) element.

Moreover, although in the present exemplary embodiment the lighting device 20 functions as a display device to display a drive mode of the image forming apparatus 10, there is no limitation thereto. Any device having a main objective of illuminating surroundings of the image forming apparatus 10 may be employed as the lighting device 20, and there is not limitation to the application of the lighting device 20.

Moreover, although in the present exemplary embodiment an example has been given of a configuration in which the image forming apparatus main body 11 has a rectangular shape with a longitudinal direction thereof along the left-right direction as viewed from the front face 11F side, the image forming apparatus main body 11 is not limited to such a shape as viewed from the front face 11F side. For example, the image forming apparatus main body 11 may have a rectangular shape with the shorter direction thereof along the left-right direction as viewed from the front face 11F side.

Furthermore, the shape of the image forming apparatus main body 11 is not limited to being a cuboidal shape. For example, a face of part of the image forming apparatus main body 11 may be a curved shape.

Moreover, although in the present exemplary embodiment, as an example, the lighting device 20 is configured disposed at the right end portion of the front face 11F of the image forming apparatus main body 11, the lighting device 20 may be disposed at the left end portion of the front face 11F of the image forming apparatus main body 11. In a configuration in which the lighting device 20 is disposed at the left end portion of the front face 11F of the image forming apparatus main body 11, the jutting out portion 13 is configured so as to be disposed along the front face 11F at the right with respect to the lighting device 20. In such cases the left side face 20L of the lighting device 20 is substantially flush with the left side face 11L of the image forming apparatus main body 11 and exposed.

Furthermore, the lighting device 20 may be configured disposed at a center in the left-right direction of the front face 11F of the image forming apparatus main body 11. Reference to "disposed at a center" means that the lighting device 20 is disposed with respect to the image forming apparatus main body 11 in a state in which the end face on the right of the lighting device 20 is further toward the left than the right side face 11R of the image forming apparatus main body 11, and the end face on the left of the lighting device 20 is further to the right than the left side face 11L of the image forming apparatus main body 11. In a configuration in which the lighting device 20 is disposed at a center in the left-right direction of the image forming apparatus main body 11, a configuration is able to be adopted in which jutting out portions 13 serving as examples of in-line portions are disposed respectively at the right and left with respect to the lighting device 20. In such a configuration in which there is a jutting out portion 13 disposed at both the right and left of the lighting device 20, by providing the "exposing portion" either to the jutting out portion 13 on the right with respect to the lighting device 20 or to the jutting out portion 13 on the left thereof, part of the lighting device 20 is exposed at the jutting out portion 13 provided with the exposing portion, and so the visibility of the lighting device 20 is improved. In a configuration in which the exposing portion is provided at both the jutting out portion 13 on the right and the jutting out portion 13 on the left, both faces of the right end face and the left end face of the lighting device 20 are exposed, and so this is preferable as the lighting device 20 is visible both from the right and the left. In a configuration in which the jutting out portion 13 is disposed at the right and left of the lighting device 20, the exposing portion is preferably provided from a one-end that is an end portion on the lighting device 20 side of the jutting out portion 13 to an other-end that is an end portion on the opposite side to the lighting device 20.

Moreover, the lighting device 20 is not limited to a configuration provided so as to project from the case 12. For example, a recess portion may be provided indenting the case 12, and the lighting device 20 may be disposed in this recess portion. In such a configuration, a portion of the case 12 where an indentation is not provided serves as an example of an "in-line portion" at an in-line position with respect to the lighting device 20.

Moreover, the front face 20F of the lighting device 20 is not limited to a configuration aligned with the upward extension plane SU that extends the front face 11F of the image forming apparatus main body 11 upward as illustrated in FIG. 5, and, for example, the front face 20F of the lighting device 20 may be configured slightly further forward than the upward extension plane SU. Both a configuration in which the front face 20F of the lighting device 20 is aligned with the upward extension plane SU, and a configuration in which the front face 20F is slightly further forward than the upward extension plane SU, are superior in appearance than a configuration in which the front face 20F is further to the rear than the upward extension plane SU. Thus the front face 20F of the lighting device 20 may be designed so as to be slightly further forward than the upward extension plane SU, so as to thereby obtain a configuration in which the front face 20F of the lighting device 20 is aligned with the upward extension plane SU or a configuration in which the front face 20F is slightly further forward than the upward extension plane SU even accounting for some tolerance in the attachment position of the lighting device 20 with respect to the case 12.

Moreover, although in the present exemplary embodiment the image forming apparatus 10 is employed as an example of an "apparatus provided with a lighting device", there is no limitation thereto. Various apparatuses may be employed as the "apparatus provided with a lighting device" and, for example, a manufacturing device for manufacturing various manufactured products may be employed therefor.

The present disclosure is not limited to the exemplary embodiments described above, and various modifications, changes and improvements may be implemented within a range not departing from the spirit of the present disclosure. For example, a configuration may be adopted in which plural of the modified examples described above are combined as appropriate.

The entire content of the disclosure of Japanese Patent Application No. 2021-127011 filed is incorporated by reference in the present specification. Moreover, all publications, patent applications and technical standards mentioned in the present specification are incorporated by reference in the present specification to the same extent as if each individual publication, patent application, or technical standard was specifically and individually indicated to be incorporated by reference.

The invention claimed is:

1. An image forming apparatus, comprising:

a lighting device disposed along a first face of a main body of the apparatus, the lighting device having an upper face, a lower face, and a plurality of end face which is between the upper face and the lower face;

an in-line portion that is at a position in line with the lighting device; and an exposing portion that is provided at the in-line portion and that exposes a portion of the end face of the lighting device at a side at which the in-line portion is positioned, wherein the end face of the lighting device at an opposite side to a side at which the in-line portion is positioned is exposed, and is disposed along an end portion of the first face.

2. The image forming apparatus of claim 1, wherein the exposing portion is formed contiguously to the in-line portion from a one-end thereof on a lighting device side to an other-end thereof on an opposite side to the lighting device.

3. The image forming apparatus of claim 1, wherein the exposing portion is provided at the in-line portion at a side of the first face of the apparatus.

4. The image forming apparatus of claim 3, wherein the exposing portion is configured by making an end face on a first face side of the in-line portion an inclined face.

5. The image forming apparatus of claim 1, wherein the lighting device is disposed at an end portion of the first face.

6. The image forming apparatus of claim 1, wherein the lighting device has a rectangular shape along a longitudinal direction of the first face as viewed from a first face side.

7. A panel member comprising:

a main body having a planar portion configuring a flat face;

a lighting device for image forming apparatus disposed along the planar portion, the lighting device having an upper face, a lower face, and a plurality of end face which is between the upper face and the lower face;

an in-line portion that is at a position in line with the lighting device; and an exposing portion that is provided at the in-line portion and that exposes a portion of the end face of the lighting device at a side at which the in-line portion is positioned, wherein the end face of the lighting device at an opposite side to a side at which the in-line portion is positioned is exposed, and is disposed along an end portion of the first face.

* * * * *